United States Patent
Shiji (10) Patent No.: US 12,549,086 B2
(45) Date of Patent: Feb. 10, 2026

(54) PARAMETER CONVERSION FOR STABILITY OF DIGITALLY CONTROLLED CONVERTER

(71) Applicant: Murata Manufacturing Co., Ltd., Nagaokakyo (JP)

(72) Inventor: Hajime Shiji, San Jose, CA (US)

(73) Assignee: MURATA MANUFACTURING CO., LTD., Kyoto (JP)

( * ) Notice: Subject to any disclaimer, the term of this patent is extended or adjusted under 35 U.S.C. 154(b) by 229 days.

(21) Appl. No.: 18/230,293

(22) Filed: Aug. 4, 2023

(65) Prior Publication Data

US 2024/0048051 A1 Feb. 8, 2024

Related U.S. Application Data

(60) Provisional application No. 63/396,007, filed on Aug. 8, 2022.

(51) Int. Cl.
*H02M 1/00* (2007.01)
*H02M 3/157* (2006.01)
*H02M 3/158* (2006.01)

(52) U.S. Cl.
CPC ......... *H02M 1/0025* (2021.05); *H02M 3/157* (2013.01); *H02M 3/158* (2013.01)

(58) Field of Classification Search
CPC ..... H02M 1/0025; H02M 3/157; H02M 3/158
See application file for complete search history.

(56) References Cited

U.S. PATENT DOCUMENTS

| | | | |
|---|---|---|---|
| 8,803,499 B2 | 8/2014 | Sreenivas et al. | |
| 8,810,221 B2 | 8/2014 | Hunt et al. | |
| 9,531,266 B2 | 12/2016 | Sreenivas et al. | |
| 10,063,158 B1 | 8/2018 | Li et al. | |
| 2014/0333276 A1 | 11/2014 | Arno | |
| 2015/0340952 A1* | 11/2015 | Manohar | H02M 3/156 323/271 |

OTHER PUBLICATIONS

Office Action in GB2311928.2, mailed Feb. 1, 2024, 5 pages.
Priya et al., "Feedback Linearization Control of Boost Converter", IEEE, Jul. 2019, pp. 169-173.
Taylor, "Feedback Linearization of Fixed Frequency PWM Converters", Dissertation, The University of Texax at Dallas, May 2004, 24 pages.

* cited by examiner

*Primary Examiner* — Jue Zhang
(74) *Attorney, Agent, or Firm* — Keating & Bennett, LLP (57) ABSTRACT

A method of digitally controlling a DC-DC converter includes detecting an output of the DC-DC converter; comparing the output to a target value to determine an error value; calculating a control parameter based on the error value in which an output control target is a linear function of the control parameter; converting the control parameter to a converter control parameter; and based on the converter control parameter, generating a pulse signal to control a power switch of the DC-DC converter.

13 Claims, 5 Drawing Sheets

PARAMETER CONVERSION FOR STABILITY OF DIGITALLY CONTROLLED CONVERTER

CROSS REFERENCE TO RELATED APPLICATIONS

This application claims the benefit of U.S. Patent Application No. 63/396,007 filed on Aug. 8, 2022. The entire contents of this application are hereby incorporated by reference.

BACKGROUND OF THE INVENTION

1. Field of the Invention

The present invention relates to converters. More specifically, the present invention relates to digitally controlled converters.

2. Description of the Related Art

When a DC-DC converter controls the output voltage, the output voltage can be unstable because of the condition of the output-controlling parameter, e.g., the duty cycle of a power switch of the DC-DC converter. The condition of the output-controlling parameter is determined by measuring the input and the output conditions of the DC-DC converter. The value and the range of the output-controlling parameter cannot be changed and is determined by circuit topology and the control method of the DC-DC converter.

Figure 1:
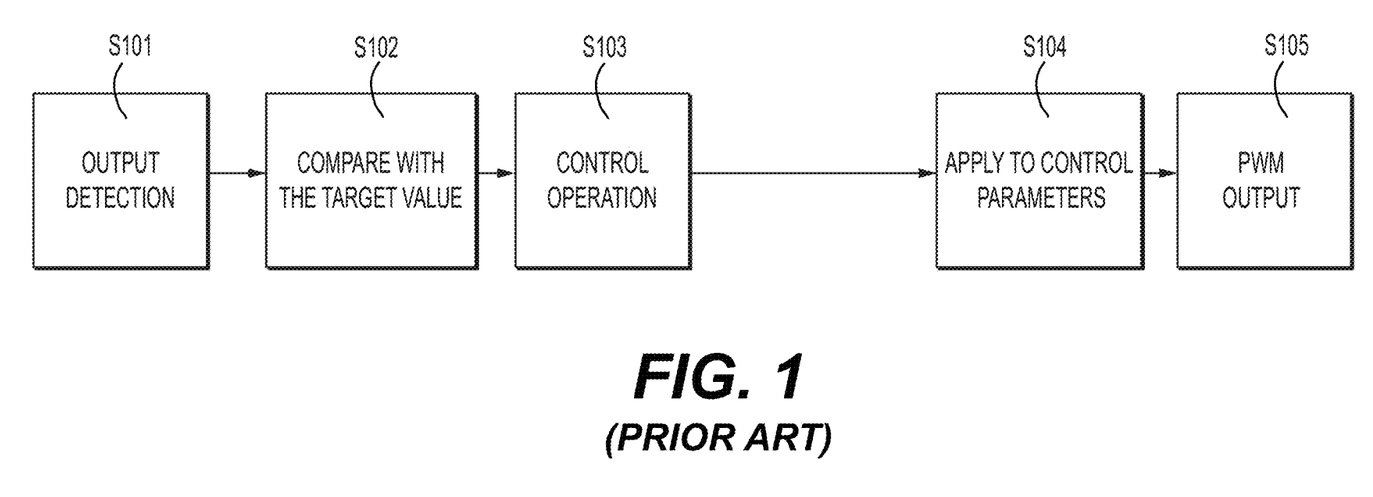
FIG. 1 is a schematic of a known control method without linearization.

Known methods of controlling a DC-DC converter include using a controller to sense an output and to adjust a control parameter based on the sensed output. For example, the detected output can be the output voltage, and the control parameter can be a duty cycle of one or more power switches in the DC-DC converter. FIG. 1 shows a known control method of a DC-DC converter. As shown in FIG. 1, an output of the DC-DC converter is detected in step S101. Then, in step S102, the detected output is compared to a target value to provide an error value, by using, for example, equation (2) below. Based on the comparison of the sensed output voltage and the target value, in step S103, control operation of the DC-DC converter is performed by the controller. For example, control equation(s), such as equation (3) below, can be used to control the DC-DC converter. The results of the control operation are then applied to the control parameters, such as in equation (4) below, in step S104. The control parameter can be, for example, the duty cycle of one or more power switches in the DC-DC converter. Then, in step S105, a pulse-wide modulation (PWM) signal is output to control the one or more power switches in the DC-DC converter to adjust the output voltage.

Figure 3:
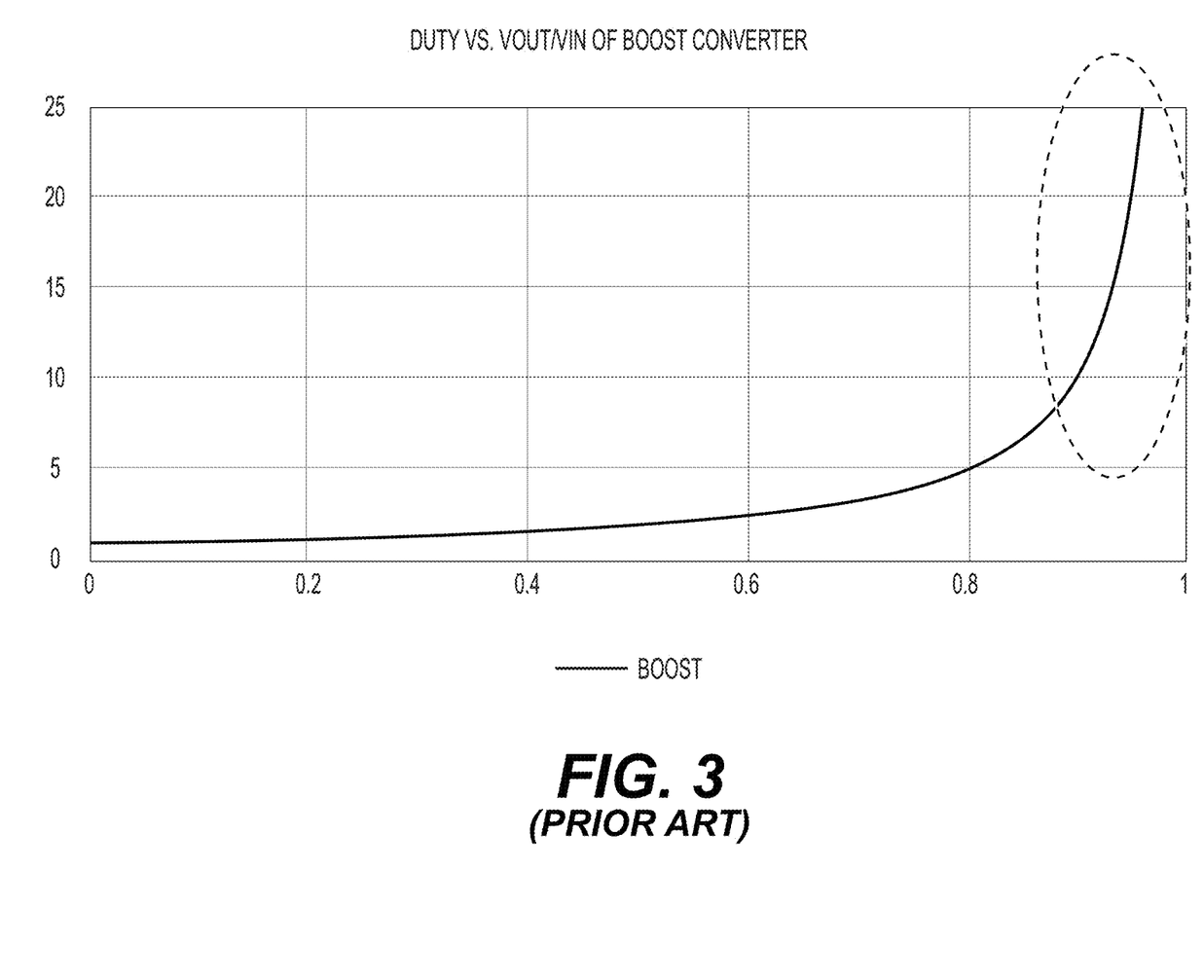
FIG. 3 is a graph showing the relationship between the duty cycle and the output voltage gain Vout/Vin of a known boost converter.

FIG. 3 shows a graph of the relationship between the duty cycle and the voltage conversion ratio Vout/Vin of a boost DC-DC converter controlled by the known control method of FIG. 1. The voltage conversion ratio is provided by the following formula:

$$\frac{V_{out}}{V_{in}} = \frac{1}{1-\text{Duty}}, (0 \leq \text{Duty} \leq 1) \quad (1)$$

As shown in the circled portion on the right-hand side of the graph of FIG. 3, in the boost DC-DC converter, the voltage conversion ratio Vout/Vin rapidly increases in a range where the duty cycle is about 0.8 or more. In actual application, the voltage conversion ratio Vout/Vin increases up to about 4, where the duty cycle is increased up to about 0.8. The relationship between the duty cycle and the voltage conversion ratio Vout/Vin is non-linear. Where the slope of the voltage conversion ratio Vout/Vin is steep (i.e., when the duty cycle is more than about 0.8), the output voltage will change excessively in response to small changes in the duty cycle, which means that the control will be unstable. When the output voltage is not stable, one known solution is to use proportional-integral-derivative (PID) control with small parameters, i.e., small values of proportional parameter Kp, integral parameter Ki, and derivative parameter Kd. But this known solution of using PID control with small parameters increases the feedback response time and does not adequately address transient load change conditions.

Example calculations to implement PID control with small PID parameters include:

$$e0 = V\text{ref} - V\text{out} \quad (2)$$

$$u0 = u1 + e0 \times (Kp + Ki + Kd) - e1 \times (Kp - Ki + 2 \times Kd) + e2 \times Kd \quad (3)$$

$$\text{Pulse\_width} = u0 \quad (4)$$

where Vref is the reference voltage value; Vout is the sensed output voltage value; e0, e1, e2 are error values with e0 being the difference between the reference voltage Vref and the sensed output voltage Vout, e1 being the error value one step before, and e2 being the error value two steps before; u0, u1 are control values with u0 being the control parameter, e.g., the duty cycle, of the next step and u1 being the control parameter of the current step; Kp is the proportional parameter; Ki is the integral parameter; and Kd is the derivative parameter; and Pulse_width is the pulse width.

Another known solution is to change the PID gain of each condition respectively. That is, the proportional parameter Kp, the integral parameter Ki, and the derivative Kd are specified for each application. The proportional parameter Kp, the integral parameter Ki, and the derivative Kd parameters are designed to provide stability and to reduce any transient feedback response. In this known solution, a controller changes the PID gain according to input and output conditions, which might require a data table. If a data table is used, then the formula for each parameter can change suddenly at the border of each condition, which can cause unstable operation. Known solutions may need multiple combinations of PID parameters to meet a certain input and output condition, respectively, which can cause unstable operation and which can require many test conditions of the multiple combinations of PID parameters. Each set of PID parameters requires evaluation and testing, which increases the cost and the time of designing the DC-DC converter.

SUMMARY OF THE INVENTION

To overcome the problems described above, preferred embodiments of the present invention provide digital controllers that can control DC-DC converters that each calculate a control parameter such that the ratio of the output voltage to the input voltage is a linear function of the control parameter, which stabilizes the output voltage of the DC-DC converter over a range of operation conditions without having to change the parameters of PID control.

According to a preferred embodiment of the present invention, a method of digitally controlling a DC-DC converter includes detecting an output of the DC-DC converter; comparing the output to a target value to determine an error value; calculating a control parameter based on the error value in which an output control target is a linear function of the control parameter; converting the control parameter to a converter control parameter; and based on the converter control parameter, generating a pulse signal to control a power switch of the DC-DC converter.

The output control target can be an output voltage, an output current, or an output power. Calculating the control parameter can include using equations that provide either proportional-integral-derivative control or proportional-integral control. The DC-DC converter can be a boost DC-DC converter.

The converter control parameter can be a duty of a power switch of the DC-DC converter; and the control parameter can be provided by the equation:

$$\frac{1}{1-\text{Duty}}$$

where Duty is the duty of the power switch of the DC-DC converter.

An output of the DC-DC converter can be a function f(z) of a control parameter z; and the control parameter z can be provided by $$z = \frac{f^{-1}(x)}{A}$$

where f(z) is a linear function defined by $$f(z)=A\cdot x.$$

The pulse signal can provide duty control, on-time control, off-time control, frequency control, or phase-shift control.

According to a preferred embodiment of the present invention, a digital controller includes a terminal configured to receive a detected signal and a terminal configured to provide a pulse signal. The digital controller can be configured and/or programmed to, when the digital controller is included in a DC-DC converter, compare the detected signal to a target value to determine an error value; calculate a control parameter based on the error value in which an output control target is a linear function of the control parameter; convert the control parameter to a converter control parameter; and based on the converter control parameter, generate the pulse signal.

Calculating the control parameter can include using equations that provide either proportional-integral-derivative control or proportional-integral control. The DC-DC converter can be a boost DC-DC converter.

The converter control parameter can be a duty of a power switch of the DC-DC converter; and the control parameter can be provided by the equation:

$$\frac{1}{1-\text{Duty}}$$

where Duty is the duty of the power switch of the DC-DC converter.

An output of the DC-DC converter can be a function f(z) of a control parameter z; and the control parameter z is provided by $$z = \frac{f^{-1}(x)}{A}$$

where f(z) is a liner function defined by $$f(z)=A\cdot x.$$

According to a preferred embodiment of the present invention, a DC-DC converter includes an output; a power switch; and the digital controller according to one of the other various preferred embodiments of the present invention connected to the power switch.

The detected signal can be received from the output of the DC-DC converter. The output can be an output voltage, an output current, or an output power.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 2:
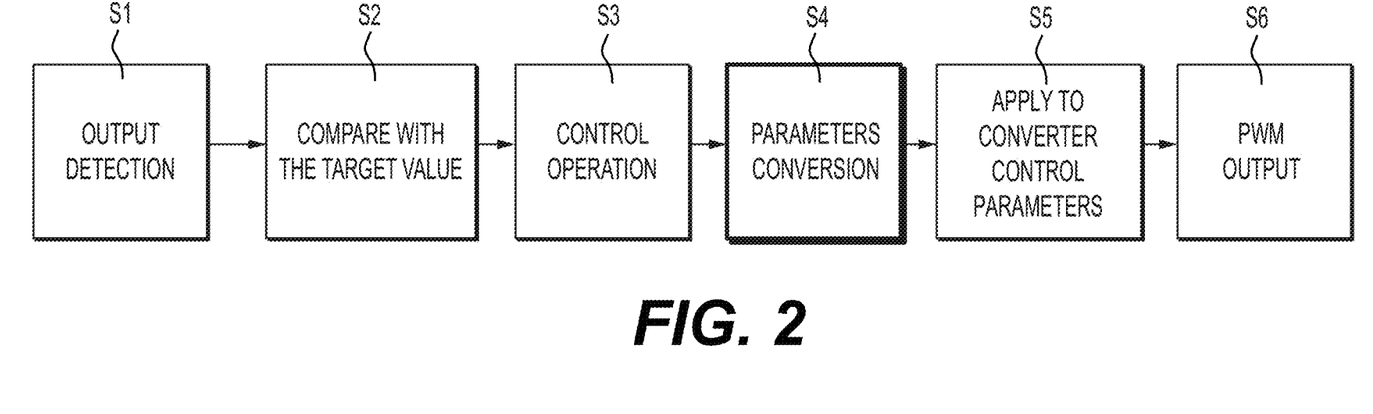
FIG. 2 is a schematic of a control method with linearization.

FIG. 2 shows a control method of a DC-DC converter that includes the step of parameter conversion. The DC-DC converter can be a boost DC-DC converter. The DC-DC converter can be controlled using any suitable control method, including, for example, PID control or proportional-integral (PI) control.

Figure 6:
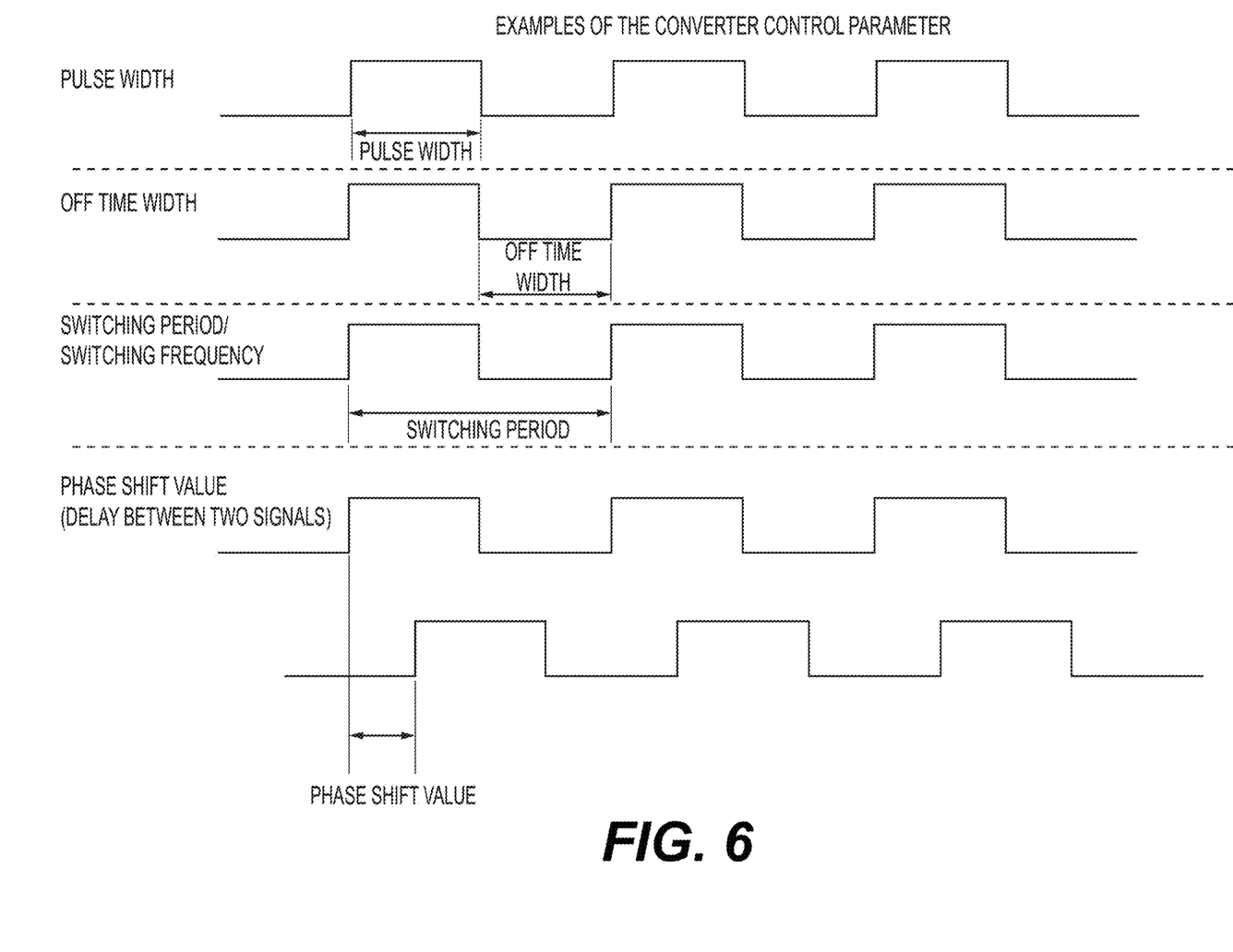
FIG. 6 shows examples of converter control parameters that can be used in the control method of FIG. 2.

In FIG. 2, an output of a DC-DC converter, including, for example, the output voltage of the DC-DC converter, can be detected by a controller in step S1. It is also possible to detect the output current or output power. In step S2, the detected output can be compared to a target value. If the output voltage, for example, is detected, then, the detected output voltage can be compared to a target value to provide an error signal, by using equation (10) below. Based on the comparison of the detected output and the target value, in step S3, the controller performs control operation of the DC-DC converter by calculating a control parameter. For example, control equation(s), such as equation (11) below, can be used to calculate the control parameter. An output control target, such as the voltage conversion ratio Vout/Vin, can be a linear equation of the control parameter, as shown, for example, in FIG. 4. In step S4, the controller can convert the control parameter, using, for example, equation (11) below, and in step S5, apply the converted control parameter to the converter control parameters, using, for example, equation (12) below. The converter control parameter(s) can be parameter(s) of the DC-DC converter that affects the output of the converter, including, for example, as shown in FIG. 6, pulse width (i.e., duty cycle), off-time width, switching period/switching frequency, and phase-shift value of the power switch(es) in the DC-DC converter. Then, the controller can generate a pulse signal, such as a pulse-wide modulation (PWM) signal, to control the DC-DC converter to adjust the output of the DC-DC converter in step S6.

The controller can be included in a control module and can include any suitable control circuitry. For example, the control module can include, for example, one or more integrated circuits (ICs), microcontrollers, or digital signal processors (DSPs), or other suitable device or devices. The module can include a terminal or terminals that can be connected to the DC-DC converter to receive signals corresponding to the output or outputs of the DC-DC converter and can include a terminal or terminals that can be connected to the DC-DC converter to provide a signal or signals that can be used to control the DC-DC converter.

The controller can detect one or more selected from the group of the output voltage, output current, input voltage, and input current. For example, detecting the output power requires that the controller detects both the output voltage and the output current.

As discussed above, the controller can use any suitable control method, including, for example, PID control or proportional-integral (PI) control.

The controller can output pulse signals to control, for example, on-time, off-time, frequency, and phase shift of power switches in the DC-DC converter. Depending on what is controlled (e.g., on-time, off-time, frequency, and phase shift) different equations can be used in the step S5 of apply to converter control parameters instead of equation (12) below. Instead of controlling the output voltage, the controller can control the output current or the output power.

Figure 4:
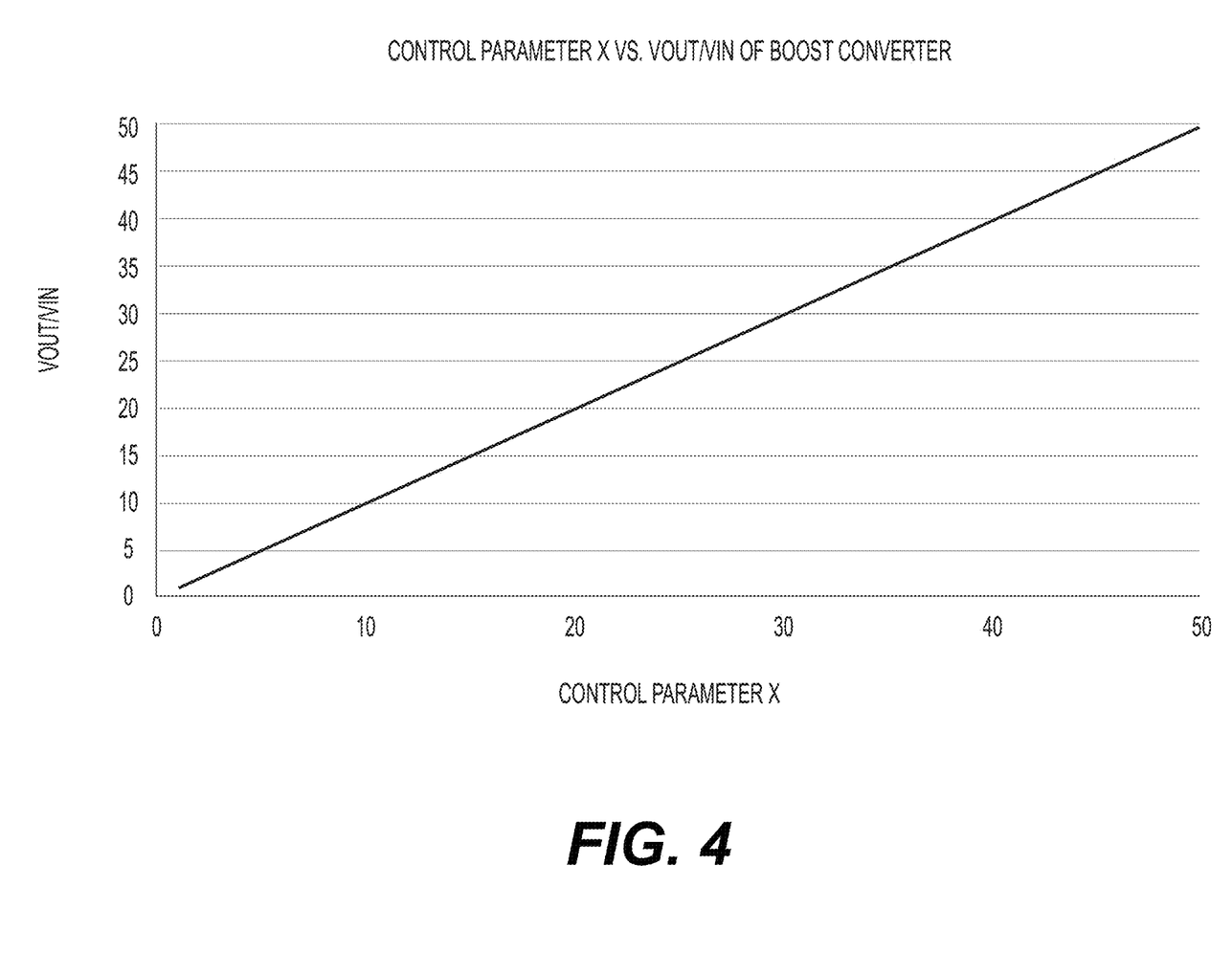
FIG. 4 is a graph showing the relationship between the parameter x and the output voltage gain Vout/Vin of a boost converter using a control method with linearization.

FIG. 4 shows the relationship between the duty cycle and the parameter x of a boost converter controlled by the control method of FIG. 2. As shown in FIG. 4, the relationship between the duty cycle and the parameter x can be linear, which provides stable control of the output voltage. When the output characteristic of the converter is a linear function of the control parameter, then the rate of change of the output voltage can be constant over the entire range of the linear control parameter, providing stable operation.

As shown in FIG. 2, a parameter conversion operation is added to change the voltage conversion ratio Vout/Vin to control parameter x so that the voltage conversion ratio Vout/Vin is a linear function of the control parameter. In other words, the derivative of the control parameter x can be constant, and the gradient of the change of the control parameter x can be constant. For example, the following parameter conversion can be used to linearize voltage conversion ratio Vout/Vin with respect to the control parameter x:

$$\frac{V_{out}}{V_{in}} = \frac{1}{1-\text{Duty}} = x \quad (5)$$

$$1 = x(1-\text{Duty}) \quad (6)$$

$$1 = x - x \times \text{Duty} \quad (7)$$

$$1 - x = -x \times \text{Duty} \quad (8)$$

$$\text{Duty} = \frac{x-1}{x} \quad (9)$$

Example calculations include, where the control parameter x in equations (5)-(9) corresponds to control parameter u0 in equations (11) and (12):

$$e0 = Vref - Vout \quad (10)$$

$$u0 = \quad (11)$$
$$u1 + e0*(Kp + Ki + Kd) - e1*(Kp - Ki + 2*Kd) + e2*Kd$$

$$u0' = \frac{u0-1}{u0} \quad (12)$$

$$\text{Pulse\_width} = u0' \quad (13)$$

where Vref is the reference voltage value; Vout is the sensed output voltage value; e0, e1, e2 are error values with e0 being the difference between the reference voltage Vref and the sensed output voltage Vout, e1 being the error value one step before, and e2 being the error value two steps before; u0, u1 are values of the control parameter with u0 being the value of the next step and u1 being the value of the current step; Kp is the proportional parameter, Ki is the integral parameter, and Kd is the derivative parameter; u0' is the converted control parameter, e.g., the duty; and Pulse_width is the pulse width. Initially, at the first step, the values of the control parameter u1 and of the error values e1, e2 can be set to zero.

Equation (11) can be used to implement PID control. But it is possible to use other control equations to implement different control techniques.

If the output control target is the output power Pout, then the following parameter conversion can be used with respect to the control parameter z:

$$Pout = A \cdot (\text{Phase\_shift\_value})^2 \quad (14)$$

$$A \cdot z = A \cdot (\text{Phase\_shift\_value})^2 \quad (15)$$

$$z = \sqrt{\text{Phase\_shift\_value}} \quad (16)$$

where the constant A is a number that can be different for each design and can be a function of the input voltage, the output voltage, the switching frequency, and circuit parameters. The constant A is canceled from both sides of equation (16), so the exact value of the constant A can be disregarded in this calculation. This parameter conversion can be applied for any design.

Example calculations include:

$$e0 = Pref - Pout \quad (17)$$

$$u0 = u1 + e0*(Kp+Ki+Kd) - e1*(Kp-Ki+2*Kd) + e2*Kd \quad (18)$$

$$u0' = \sqrt{u0} \quad (19)$$

$$\text{Phase\_shift\_value} = u0' \quad (20)$$

where Pref is the reference power value; Pout is the sensed output power value; e0, e1, e2 are error values with e0 being the difference between the reference power Pref and the sensed output power Pout, e1 being the error value one step before, and e2 being the error value two steps before; u0, u1 are values of the control parameter with u0 being the value of the next step and u1 being the value of the current step; Kp is the proportional parameter, Ki is the integral parameter, and Kd is the derivative parameter; u0' is the converted control parameter, e.g., the phase shift value; and Phase_shift_value is the phase shift value. Initially, at the first step, the values of the control parameter u1 and of the error values e1, e2 can be set to zero.

For other topologies, control methods, and control targets, the techniques described above can be generalized. For example, if the output voltage Vout is a function of the control parameter z, then $$V_{out}=f(z) \tag{14}$$

Instead of the output voltage, it is possible to use the output current or the output power, depending on the control target, circuit topology of the converter, control method, etc. If the function f is defined as a linear function, then $$f(z)=A \cdot x \tag{15}$$

where A is an arbitrary value that can simplify the function. To provide a linear function $$z = \frac{f^{-1}(x)}{A} \tag{16}$$

Figure 5:
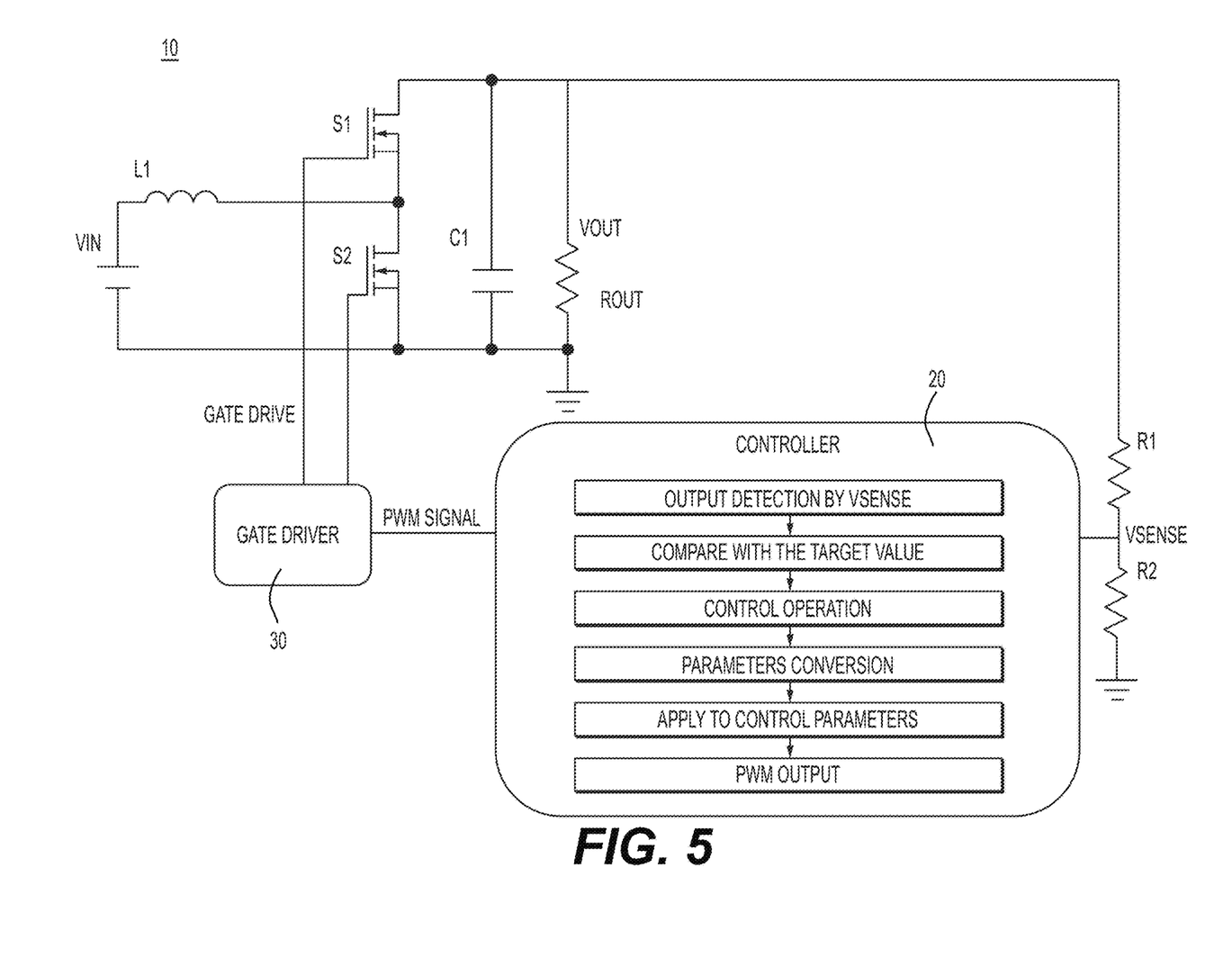
FIG. 5 shows an example of a boost converter to which the control method of FIG. 2 can be applied.

FIG. 5 shows an example of a DC-DC converter 10 that can be controlled using the above-discussed control methods. The DC-DC converter 10 includes an input voltage Vin, inductor L1 connected to the input voltage Vin, series-connected power switches S1, S2 with a node between the power switches S1, S2 connected to the inductor L1, an output capacitor C1 connected in parallel with the power switches S1, S2, and a resistor Rout representing the load. The DC-DC converter 10 also includes a controller 20 that detects the output voltage through the voltage-sense voltage divider Vsense that includes series-connected resistors R1, R2 and that provides a pulse or PWM signal to the gate driver 30 that drives the power switches S1, S2. That is, the controller 10 can include a terminal that receives the detected output voltage from the voltage-sense voltage divider Vsense and a terminal that provides the pulse signal.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method of digitally controlling a DC-DC converter, the method comprising:
    detecting an output of the DC-DC converter;
    comparing the output to a target value to determine an error value;
    calculating a control parameter based on the error value in which an output control target is a linear function of the control parameter;
    converting the control parameter to a converter control parameter; and
    based on the converter control parameter, generating a pulse signal to control a power switch of the DC-DC converter; wherein
    calculating the control parameter includes using equations that provide either proportional-integral-derivative control or proportional-integral control.

2. The method of claim 1, wherein the output control target is an output voltage, an output current, or an output power.

3. The method of claim 1, wherein the DC-DC converter is a boost DC-DC converter.

4. The method of claim 1, wherein
    the converter control parameter is a duty of the power switch of the DC-DC converter; and
    the control parameter is provided by an equation:

$$\frac{1}{1-\text{Duty}}$$

where Duty is the duty of the power switch of the DC-DC converter.

5. The method of claim 1, wherein
    the output of the DC-DC converter is a function f(z) of a control parameter z; and
    the control parameter z is provided by $$z = \frac{f^{-1}(x)}{A}$$

where A is an arbitrary value and f(z) is a linear function defined by $$f(z)=A \cdot x.$$

6. The method of claim 1, wherein the pulse signal provides duty control, on-time control, off-time control, frequency control, or phase-shift control.

7. A digital controller comprising:
    a terminal configured to receive a detected signal; and
    a terminal configured to provide a pulse signal; wherein
    the digital controller is configured and/or programmed to, when the digital controller is included in a DC-DC converter:
        compare the detected signal to a target value to determine an error value;
        calculate a control parameter based on the error value in which an output control target is a linear function of the control parameter;
        convert the control parameter to a converter control parameter; and
        based on the converter control parameter, generate the pulse signal, wherein
    calculating the control parameter includes using equations that provide either proportional-integral-derivative control or proportional-integral control.

8. The digital controller of claim 7, wherein the DC-DC converter is a boost DC-DC converter.

9. The digital controller of claim 7, wherein
    the converter control parameter is a duty of a power switch of the DC-DC converter; and
    the control parameter is provided by an equation:

$$\frac{1}{1-\text{Duty}}$$

where Duty is the duty of the power switch of the DC-DC converter.

10. The digital controller of claim 7, wherein
    an output of the DC-DC converter is a function f(z) of a control parameter z; and
    the control parameter z is provided by $$z = \frac{f^{-1}(x)}{A}$$

where A is an arbitrary value and f(z) is a liner function defined by $$f(z)=A \cdot x.$$

11. A DC-DC converter comprising:
an output;
a power switch; and
the digital controller of claim 7 connected to the power switch.

12. The DC-DC converter of claim 11, wherein the detected signal is received from the output of the DC-DC converter.

13. The DC-DC converter of claim 12, wherein the output is an output voltage, an output current, or an output power.

* * * * *